United States Patent [19]

Daggy

[11] 4,073,963
[45] Feb. 14, 1978

[54] STABLE, HOMOGENEOUS BUTTERED TABLE SYRUPS

[75] Inventor: Elmer E. Daggy, Tenafly, N.J.

[73] Assignee: CPC International Inc., Englewood Cliffs, N.J.

[21] Appl. No.: 754,707

[22] Filed: Dec. 27, 1976

[51] Int. Cl.$^2$ ............................................. A23L 1/09
[52] U.S. Cl. .................................. 426/658; 426/653
[58] Field of Search ............................. 426/658, 653

[56] References Cited

U.S. PATENT DOCUMENTS

| | | | |
|---|---|---|---|
| 3,057,734 | 10/1962 | Pader | 426/658 |
| 3,282,707 | 11/1966 | Topalian et al. | 426/658 |
| 3,362,833 | 1/1968 | Smith | 426/658 |
| 3,897,262 | 7/1975 | Carlson | 426/658 |

*Primary Examiner*—Jeanette M. Hunter
*Attorney, Agent, or Firm*—John P. Floyd; David H. LeRoy; John A. Stemwedel

[57] ABSTRACT

Stable, homogeneous buttered table syrups are obtained by incorporating in the table syrup formulations an emulsion system consisting of at least 0.1% by weight sodium stearoyl-2-lactylate, at least 0.2% by weight sorbitan monostearate, and at least 2.0% by weight butter. The sugar solids content of the table syrup is adjusted to be no less than 65% Brix, its viscosity is no less than about 300 cps and its pH is about 4.0–5.5. Table syrups containing the emulsion system exhibit good clarity and prolonged shelf life stability.

51 Claims, No Drawings

STABLE, HOMOGENEOUS BUTTERED TABLE SYRUPS

This invention relates to a stable, homogeneous buttered table syrup product and a method for making the same.

BACKGROUND OF THE INVENTION

The prior art reveals several attempts directed toward obtaining a homogeneous, shelf-stable table syrup. The approaches used to obtain such a product have generally included the use of various emulsifier systems together with an assortment of stabilizing agents to produce table syrups that are basically oil-in-water emulsion-type systems.

U.S. Pat. No. 3,057,734 discloses a table syrup product having at least about 65% by weight sugar solids and containing a stable oil-in-water emulsion having fat or butter fat present in amounts of 1.0–4.0% by weight. To obtain the stable emulsion, a stabilizing agent is used such as water-dispersible proteins, gum arabic and edible algin derivatives. Interestingly, this patent discloses that conventional emulsifiers such as the "Spans," "Tweens" and other fatty-acid based emulsifiers are ineffective to stabilize fat-in-sugar syrup emulsions.

A table syrup containing at least 65% by weight sugar and having a stable oil-in-water emulsion is disclosed in U.S. Pat. No. 3,282,707. The emulsifier system contains 1.0–4.0% butter fat, 0.02–0.05% lecithin and 0.1–1.0% gum ghatti which is purported to be more effective against stabilization than other stabilizers such as algin derivatives.

A product similar to that disclosed in U.S. Pat. No. 3,282,707 above is disclosed in U.S. Pat. No. 3,362,833. The table syrup product of this patent also comprises 65% sugar and a stable oil-in-water emulsion having 1.0–4.0% of an edible oil and 0.1–1.0% gum ghatti as stabilizer. While this patent also discloses the use of lecithin as stabilizer as in U.S. Pat. No. 3,282,707, its claims include only gum ghatti as the stabilizer.

THE INVENTION

It has now been found that a homogeneous, stable buttered table syrup can be obtained by preparing an emulsifier system containing emulsifier and anhydrous butter oil or anhydrous butter fat; dispersing the emulsion system into a syrup; homogenizing the syrup dispersion; and, cooling the syrup dispersion.

The emulsifier system consists of the combination of a minimum of 0.1% by weight sodium stearoyl-2-lactylate (SSL), commercially available under the trade name Emplex, and a minimum of 0.2% by weight sorbitan monostearate, commercially available under the trade name Span 60, blended with a minimum of 2.0% by weight butter. Higher levels of emulsifiers can be used, for example, to mask undesirable off-flavors, but at these minimum levels, the emulsifiers in the emulsifier system have been found to be completely effective. Accordingly, SSL and Span 60 can each be used in amounts up to about 0.4% by weight. When Span 60 was used in amounts greater than about 0.4% by weight, the resulting syrup foamed and also created a bitter off-flavor. For purposes of economy, performance and effectiveness, therefore, the amount of SSL used should be no less than 0.1% and no more than about 0.4% by weight and the amount of Span 60 used should be no less than 0.2% and no more than about 0.4% by weight.

The components SSL and Span 60 of the emulsifier system were each tested separately with the minimum level of 2.0% by weight butter and 2.0% by weight anhydrous butter fat or anhydrous butter oil. It was found that, regardless of the amounts used, neither SSL nor Span 60 were completely effective when used alone. While it is not completely understood, it appears that when SSL and Span 60 are used in combination at their minimum levels, an effective emulsifier system is realized, thus indicating that a synergistic effect is obtained.

Since the table syrups to which the present invention is directed are "buttered" table syrups, they fall under the "Standard of Identity for Table Syrups" as published in the *Federal Register,* Vol. 39, No. 116, June 14, 1974, effective Jan. 1, 1975. If a table syrup is labeled as "buttered", the Standard of Identity includes in its specifications that the table syrup must contain a minimum of 65% Brix sweetener solids and a minimum of 2.0% by weight butter; i.e., butter that includes water. For purposes of economy and ease of formulating the table syrup product of the invention, the use of anhydrous butter fat or butter oil is preferred. Therefore, to meet the requirements of the Standard of Identity, the minimum amount of anhydrous butter fat or anhydrous butter oil that can be used is 1.6% by weight, although an amount of 2.0% by weight is preferred.

The syrup or sweetener with which the emulsion system of the invention is blended and then homogenized should contain at least 65% Brix sugar solids to comply with the "Standard of Identity for Table Syrups" and can comprise a mixture of sweeteners such as corn syrup, dextrose and sucrose. Preferably, the minimum sugar solids used is 67% Brix and it was found that the sugar solids can be increased to about 70% Brix. However, table syrups containing more than about 70% Brix sugar solids developed increased viscosity and became cloudy.

The table syrups of the invention exhibit excellent shelf-life stability with no separation or change in viscosity or flavor over prolonged periods of time. If desired, viscosity of the table syrup product can be increased by adding small amounts of gum ghatti on the order of about 0.5–1.0% by weight. Use of other thickener-type gums such as Xanthan gum, propylene glycol alginate, carboxy methyl cellulose, carrageenan gum, locust bean gum, guar gum, gelatin, pectin, and the like were found to be incompatible as they caused a precipitate when blended with the sweeteners in the syrup. Thus, while prior art table syrups generally include emulsifiers, stabilizers and viscosity adjusting agents, the buttered table syrup of this invention meets the Standard of Identity without the need to add gums in order to increase viscosity or the use of other additives to obtain shelf life stability. This is achieved by incorporating the emulsion system of the invention into a table syrup.

The viscosity and pH of the table syrup product of the invention are also important. It was found that the viscosity should be no less than about 300 centipoises (cps), Brookfield, preferably 400–600 cps, and can be as high as 800 cps or higher. At viscosities less than about 300 cps, emulsion stability of the product was affected. Viscosities higher than about 800 cps can be used provided the clarity of the product is not adversely affected.

The pH of the table syrup product should be about 4.0–5.5, preferably 4.5–5.0. At pH levels lower than about 4.0, it was found that the product developed bitter off-flavors that could not be readily masked. At pH levels higher than about 5.5, it was found that the microbiological stability of the product was adversely affected; that is, the product developed air-borne surface molds.

The table syrup product of the invention and a method for producing it are further illustrated in the following examples.

EXAMPLE 1

The formula for a typical buttered table syrup product of the invention is shown below as Product A wherein the amounts of each ingredient are given as percent by weight of the product formula.

| PRODUCT A | | |
|---|---|---|
| Ingredient | | Amount (% by weight) |
| Corn Syrup #1435 | (d.s.:17.4) | 21.72 |
| Dextrose Hydrate 2001 | (d.s.:15.6) | 17.09 |
| Sucrose, Granulated | (d.s.:31.3) | 31.42 |
| Flo-Sweet #2179 | (d.s.: 2.0) | 2.92 |
| (Total d.s.:66.3) | | |
| Sodium citrate | | 0.05 |
| Citric acid | | 0.05 |
| Butter flavor | | 0.30 |
| Butter vanilla flavor | | 0.04 |
| Maple flavor | | 0.45 |
| Sodium benzoate | | 0.10 |
| Butter oil (Anhydrous) | | 2.00 |
| Span 60 (sorbitan monostearate) | | 0.20 |
| SSL (sodium stearoyl-2-lactylate) | | 0.10 |
| Water | | 23.56 |
| | Total | 100.00 |

In the above product formula, Flo-Sweet #2179 is the trade designation for a commercially obtained dark sugar syrup with brown sugar flavoring and the butter flavor and butter vanilla flavor were also commercially obtained flavoring agents. Sodium citrate and citric acid are typically used as a buffering agent/metal chelating/pH adjustment blend and sodium benzoate is a typical preservative. The "d.s." values denote the "dry substance" weight basis of the four basic sweeteners. The sugar solids content of Product A was found to be 67.2–68.0% Brix (hydrometer spindle method as described by Browne and Zerban in *Physical and Chemical Methods of Sugar Analysis*), viscosity was found to be about 300 cps, and its pH was 4.9. Product A was found to be stable for a period of 14 days at a temperature of 120° F.

Another typical buttered table syrup product of the invention having improved stability at a higher sugar solids content of about 70% Brix is shown below as Product B, the amounts shown being set forth as percent by weight of the product formula.

| PRODUCT B | | |
|---|---|---|
| Ingredient | | Amount (% by weight) |
| Corn Syrup #1435 | (d.s.:18.47) | 21.87 |
| Dextrose Hydrate 2001 | (d.s.:16.39) | 17.91 |
| Sucrose, Granulated | (d.s.:32.92) | 32.92 |
| Flo-Sweet #2179 | (d.s.:2.04) | 2.97 |
| (Total d.s.:69.82) | | |
| Sodium citrate | | 0.05 |
| Citric acid | | 0.05 |
| Butter flavor | | 0.20 |
| Maple flavor | | 0.27 |
| Sodium benzoate | | 0.10 |
| Butter oil (Anhydrous) | | 2.00 |
| Span 60 (sorbitan monostearate) | | 0.20 |
| SSL (sodium stearoyl-2-lactylate) | | 0.10 |

| PRODUCT B (continued) | |
|---|---|
| Ingredient | Amount (% by weight) |
| Water | 21.36 |
| Total | 100.00 |

The sugar solids content of Product B was found to be 69.82% Brix, its pH was 4.6 and its viscosity was 840 cps. Product B was also found to be stable for a period of 14 days at a temperature of 120° F. Thus, increased viscosity, whether obtained by adding an appropriate gum or adjusting the Brix value, appears to aid stability of the table syrup.

EXAMPLE 2

The procedure used for making the table syrup products of the invention such as Products A and B of Example 1 was as follows:

The corn syrup was charged to a steam jacketed vessel together with about 75% of the water (17.7% H$_2$O) and the corn syrup-water mixture was heated to about 120° F. for 15–30 minutes to reduce mixture viscosity.

The dextrose hydrate and sucrose were dissolved in the corn syrup-water mixture while maintaining the temperature of the mixture at 120° F.

A melt consisting of a mixture of the anhydrous butter oil, Span 60 and SSL was separately prepared at 160° F. and maintained at this temperature.

A blend of the flavors consisting of Flo-Sweet 2179, butter flavor, butter vanilla flavor and maple flavor was separately prepared, warmed to about 120° F. and maintained at this temperature.

The sodium citrate, citric acid and sodium benzoate were then dissolved in the remaining 25% water.

The blend of flavors was then added to the mixture in the steam jacket while maintaining the mixture temperature at 120° F.

The flavor blend container was rinsed with the water solution which was then added to the steam jacket mixture. The mixture was then agitated (stirrer blades rotating at about 40–100 rpm) for 15 minutes as its temperature was increased to 130° F. to obtain a base syrup.

With rapid agitation (stirrer blades rotating at about 400–500 rpm), the melt was added to the base syrup while maintaining its temperature at between 130°–135° F. and mixing was continued until a uniform syrup blend was obtained; i.e., the syrup blend was uniformly clear.

The syrup blend was adjusted for final water content and desired percent sugar solids content (Brix) using conventional read-out refractometers.

The temperature of the syrup blend was increased to 170° F. and held there for about 10 minutes, then passed through a single stage Manton Gaulin homogenizer, at 8000 p.s.i.

While maintaining the temperature of the homogenized syrup blend at 170° F., the blend was filled into rigid consumer containers following which the filled containers were rapidly cooled to 75° F. to stabilize the butter oil in the emulsion system by passing the containers through a cooling chamber.

EXAMPLE 3

Following the procedure set forth in Example 2, several syrup blends were formulated wherein only the amounts of corn syrup, dextrose and sucrose were varied. The solids content (Brix), viscosity (Brookfield) and pH of the blends were determined and compared with a commercially obtained table syrup, identified as "Control", which was also analyzed for these values. The results obtained are set forth in Table I below which includes Products A and B from Example 1. Product A was modified to include 0.5% by weight gum ghatti. The percent (%) sweeteners; i.e., corn syrup, dextrose and sucrose, are expressed on a percent dry substance (d.s.) basis.

TABLE I

Comparison of Sweetener Components, Solids Content, Viscosity and pH of Various Syrup Blends with Commercially Obtained Table Syrup

| Product | Corn Syrup (% d.s.) | Dextrose (% d.s.) | Sucrose (% d.s.) | Solids (Brix) | Viscosity (cps) (Brookfield) | pH |
|---|---|---|---|---|---|---|
| Control | 39.0 | 0.0 | 29.5 | 67.4 | 820 | 4.6 |
| A | 21.7 | 17.1 | 31.4 | 67.6 | 300 | 4.9 |
| B | 21.9 | 17.9 | 32.9 | 69.8 | 840 | 4.6 |
| C | 49.51 | 0.0 | 14.79 | 67.32 | 410 | 4.6 |
| D | 34.08 | 15.43 | 14.78 | 67.8 | 310 | 4.9 |
| E | 19.93 | 15.43 | 28.94 | 67.8 | 300 | 4.9 |
| F | 35.37 | 0.0 | 28.93 | 67.9 | 400 | 4.6 |
| G | 29.77 | 10.29 | 24.24 | 67.38 | 305 | 4.7 |
| H | 39.61 | 5.14 | 19.55 | 67.82 | 510 | 4.8 |
| I | 31.89 | 12.86 | 19.54 | 68.8 | 390 | 4.8 |
| J | 24.82 | 12.86 | 26.62 | 67.88 | 370 | 4.7 |
| K | 32.54 | 5.14 | 26.62 | 67.74 | 460 | 4.7 |

From the syrup blends shown in Table I above it will be seen that the "Control" product had a significantly higher viscosity than the remaining syrup blends indicating that the syrup blends of the invention having low viscosities are at least comparable to the higher viscosity "Control" product. All of the syrup blends in Table I except products C and F were found to be stable when subjected to a temperature of 120° F. for a period of 14 days.

EXAMPLE 4

An 8,000 gram portion of each of the syrup blends set forth in Table 1 above was prepared, homogenized to a uniform blend at 8,000 p.s.i. as in Example 2 above, and filled while hot; e.g., 165°-170° F., into conventional brown bottles. The syrup blends were then cooled to a temperature of about 50°-60° F. by immersing the filled bottles in an ice water bath.

Each of the syrup blends was then analyzed for stability, crystallization and clarity. The blends were subjected to three different types of stability tests, namely: (1) emulsion stability wherein the blends were held at a temperature of 120° F. for a period of 14 days, (2) centrifuge stability wherein the blends were subjected to three centrifugation cycles each at 1800 rpm for a period of 15 minutes, and (3) chill stability wherein the temperature of the blends was reduced to about 40°-44° F. and then allowed to equilibrate to room temperature. The blends were also analyzed for clarity using a model B Beckman Spectrophometer 2 cm. cell, 600 mμ, the higher the numerical value indicating greater clarity; i.e., better transmission of light through the syrup blend. The method used to determine clarity is also described by Browne and Zerban in *Physical and Chemical Methods of Sugar Analysis.*

The results of these tests are set forth in Table II below:

TABLE II

ANALYSIS OF PHYSICAL CHARACTERISTICS OF SYRUP BLENDS

| Product | Emulsion Stability | Centrifuge Stability | Chill Stability | Crystallization | Clarity |
|---|---|---|---|---|---|
| Control | Stable | Stable | Stable | None | 37.0 |
| A | Stable | Stable | Stable | None | 31.0 |
| B | Stable | Stable | Stable | None | 11.0 |
| C | Broken | Stable | Stable | None | 26.0 |
| D | Stable | Stable | Stable | None | 28.0 |
| E | Stable | Stable | Stable | None | 35.0 |
| F | Broken | Stable | Stable | None | 36.0 |
| G | Stable | Stable | Stable | None | 37.0 |
| H | Stable | Stable | Stable | None | 31.0 |
| I | Stable | Stable | Stable | None | 31.0 |
| J | Stable | Stable | Stable | None | 37.0 |
| K | Stable | Stable | Stable | None | 38.5 |

EXAMPLE 5

In developing the emulsion system of the invention, two basic criteria were used to determine whether a buttered table syrup will be homogeneous and have prolonged shelf-life stability without flavor loss and without emulsion break; that is, without separation upon standing. These criteria are: (1) the buttered table syrup must be capable of withstanding centrifugation at 1800 rpm for 15 minutes, 10.5 inch arm diameter, three cycles; and, (2) the buttered table syrup must be capable of withstanding accelerated shelf-life testing when subjected to a water bath held at a temperature of 120° F. for a period of at least two weeks.

Accordingly, various emulsion systems were tested and analyzed. In Table III below, the results of testing hydrocolloid-emulsifier combinations are set forth while Table IV below sets forth the results of testing various other emulsifier combinations. The ingredients of each of the emulsifier systems set forth in Tables III and IV are expressed as % by weight of the buttered table syrup and each of the syrups includes 2% by weight anhydrous butter fat. Emulsion performance in each instance was evaluated after the emulsifier system was subjected to the centrifugation test and is expressed as "failed" or "passed". In Tables III and IV, many of the hydrocolloids and emulsifiers are commercially available materials which have been listed by their trade names. The major chemical composition of those identified by trade name is as follows:

| Trade Name | Chemical Composition |
|---|---|
| Atmos 150 | Mono- and diglycerides |
| Avicel 591 | Microcrystalline cellulose or cellulose gum |
| Drew-Pol 3-1-5 | Triglycerol monostearate |
| Drew-Pol 6-2-S | Hexaglycerol distearate |
| Durolac 100 | Glycerol-lacto esters of fatty acids |
| Emplex | Sodium stearoyl-2-lactylate |
| Morex 1918 | Hydrolyzed cereal solids |
| Polyglycerol 3-1-0 | Tetra glycerol oleate |
| Polyglycerol 10-4-G | Decca polyglycerol gluconate |
| Polyglycerol 10-4-0 | Diglycerol tetraoleate |
| Polysorbate 60 | Polyoxyethylene sorbitan monostearate |
| Span 60 | Sorbitan monostearate |
| Tween 60 | Polyoxyethylene (20) sorbitan monostearate |

TABLE III

HYDROCOLLOID-EMULSIFIER COMBINATIONS

| System No. | Hydrocolloid | Amount (% by wgt) | Emulsifier | Amount (% by wgt) | Emulsion Performance |
|---|---|---|---|---|---|
| 1 | Xanthan Gum | 0.05 | — | — | Failed |
| 2 | Xanthan Gum | 0.05 | Tween 60 | 0.02 | Failed |

TABLE III-continued
HYDROCOLLOID-EMULSIFIER COMBINATIONS

| System No. | Hydrocolloid | Amount (% by wgt) | Emulsifier | Amount (% by wgt) | Emulsion Performance |
|---|---|---|---|---|---|
| 3 | Xanthan Gum | 0.025 | Polysorbate 60 | 0.02 | Failed |
| 4 | Xanthan Gum | 0.025 | Polyglycerol 10-4-0 | 0.5 | Failed |
| 5 | Xanthan Gum | 0.025 | Polyglycerol 3-1-0 | 0.5 | Failed |
| 6 | Xanthan Gum | 0.025 | Emplex | 0.4 | Failed |
| 7 | Xanthan Gum | 0.025 | Emplex | 0.3 | Failed |
| 8 | Xanthan Gum | 0.025 | Emplex | 0.2 | Failed |
| 9 | Xanthan Gum | 0.025 | Emplex | 0.1 | Failed |
| 10 | Xanthan Gum | 0.025 | Emplex | 0.05 | Failed |
| 11 | Xanthan Gum | 0.025 | Emplex | 0.01 | Failed |
| 12 | Xanthan Gum | 0.025 | Drew-Pol 3-1-5 | 0.5 | Failed |
| 13 | Xanthan Gum | 0.025 | Drew-Pol 6-2-S | 0.5 | Failed |
| 14 | Xanthan Gum | 0.025 | Durolac 100 | 0.1 | Failed |
| 15 | Xanthan Gum | 0.025 | Atmos 150 | 0.4 | Failed |

TABLE IV
VARIOUS EMULSIFIER COMBINATIONS

| System No. | Emulsifier | Amount (% by wgt) | Emulsifier | Amount (% by wgt) | Emulsion Performance |
|---|---|---|---|---|---|
| 16 | Emplex | 0.1 | Polysorbate 60 | 0.05 | Failed |
| 17 | Emplex | 0.1 | Polyglycerol 10-4-G | 0.15 | Failed |
| 18 | Emplex | 0.1 | Gelatin | 0.2 | Failed |
| 19 | Emplex | 0.1 | — | — | Failed |
| 20 | Emplex | 0.1 | Span 60 | 0.4 | Passed |
| 21 | Emplex | 0.1 | Morex 1918 | 0.5 | Failed |
| 22 | Emplex | 0.1 | Avicel 591 | 0.25 | Failed |
| 23 | — | — | Avicel 591 | 0.25 | Failed |
| 24 | Tween 60 | 0.15 | Atmos 150 | 0.25 | Failed |
| 25 | Emplex | 0.1 | Span 60 | 0.01 | Failed |
| 26 | Emplex | 0.1 | Span 60 | 0.05 | Failed |
| 27 | Emplex | 0.1 | Span 60 | 0.1 | Passed |
| 28 | Emplex | 0.1 | Span 60 | 0.2 | Passed |
| 29 | Emplex | 0.1 | Span 60 | 0.3 | Passed |
| 30 | Emplex | 0.1 | Span 60 | 0.4 | Passed |
| 31 | Emplex | 0.1 | Span 60/Tween 60 | 0.15/0.05 | Failed |
| 32 | Emplex | 0.1 | Span 60/Tween 60 | 0.1/0.1 | Failed |
| 33 | Emplex | 0.1 | Span 60/Tween 60 | 0.05/0.15 | Failed |

The results in Tables III and IV above reveal that the combination of Xanthan Gum at 0.025% with Emplex at 0.1%–0.3% (System Nos. 8, 9, 10) did not pass the centrifuge test, but the combination of Emplex at 0.1% with Span 60 at 0.05%–0.4% (System Nos. 27–30) did pass the centrifuge test.

EXAMPLE 6

Varying amounts of an emulsion system consisting of the emulsifiers Emplex (SSL) and Span 60 (sorbitan monostearate) were used to prepare buttered table syrups following the procedure set forth in Example 2 above. Each of the syrups contained 2% by weight anhydrous butter oil in addition to the emulsion system. The table syrups were homogenized at 160° F. in a Manton Gaulin Homogenizer at a pressure of 8000 lbs/in². The syrups were then divided into two portions. One portion was allowed to cool to room temperature while the other portion was chilled rapidly to 70°–80° F. on an ice cold water slush bath. Each of the portions was then subjected to the centrifuging test to determine the effect of temperature on the emulsion system. The results of these tests are set forth in Table V below wherein "hot" identifies that portion which was allowed to cool to room temperature, "cooled" identifies that portion which was rapidly chilled, amounts given are by weight percent of the table syrup and the results are expressed as "passed" or "failed" indicating emulsion stability ("passed") or emulsion break ("failed").

TABLE V

| System No. | Emulsion System Emplex | Span 60 | Emulsion Performance Hot | Cooled |
|---|---|---|---|---|
| 34 | 0.1 | 0.1 | Failed | Failed |
| 35 | 0.1 | 0.2 | Passed | Passed |
| 36 | 0.1 | 0.4 | Passed | Passed |
| 37 | 0.2 | 0.2 | Passed | Passed |
| 38 | 0.3 | 0.3 | Passed | Passed |
| 39 | 0.4 | 0.1 | Failed | Passed |
| 40 | 0.4 | 0.4 | Passed | Passed |

The results set forth in Table V above indicate that minimum levels in the emulsifier system are 0.1% by weight Emplex and 0.2% by weight Span 60 to obtain an acceptable product. It will be noted that when amounts of each emulsifier were increased up to and including 0.4% by weight, no change in performance was noted. Thus, the upper levels of each of the emulsifiers in the system are not critical to emulsion performance of the table syrup. Consequently, the maximum amounts of emulsifiers that can be used will be dependent on other factors such as flavor and foaming as mentioned earlier.

What is claimed:

1. An emulsion system for a homogeneous, stable buttered table syrup having a sugar solids content of at least 65% Brix, said emulsion system consisting essentially of at least 0.1% by weight sodium stearoyl-2-lactylate; at least 0.2% by weight sorbitan monostearate; and, at least 1.6% by weight anhydrous butter oil or anhydrous butter fat.

2. The emulsion system of claim 1 wherein the sugar solids content of said buttered table syrup is at least about 67% Brix.

3. The emulsion system of claim 1 wherein the sugar solids content of said buttered table syrup is about 70% Brix.

4. The emulsion system of claim 1 wherein said sugar solids comprises a mixture of corn syrup, dextrose and sucrose.

5. The emulsion system of claim 1 wherein said sodium stearoyl-2-lactylate and said sorbitan monostearate are present in amounts of up to about 0.4% by weight.

6. The emulsion system of claim 1 wherein said anhydrous butter oil or anhydrous butter fat is present in an amount of at least about 2.0% by weight.

7. The emulsion system of claim 1 wherein said buttered table syrup has a pH of about 4.0–5.5 and a viscosity of at least about 300 cps.

8. The emulsion system of claim 7 wherein said pH is about 4.5–5.0 and said viscosity is no greater than about 800 cps.

9. The emulsion system of claim 8 wherein said viscosity is about 400–600 cps.

10. The emulsion system of claim 1 that includes gum ghatti as viscosity agent in an amount of about 0.5–1.0% by weight.

11. An emulsion system for a homogeneous, stable buttered table syrup having a sugar solids content of at least about 67% Brix, said emulsion system consisting essentially of at least 0.1% by weight to about 0.4% by weight sodium stearoyl-2-lactylate; at least 0.2% by weight to about 0.4% by weight sorbitan monostearate; and, at least 1.6% by weight anhydrous butter oil or anhydrous butter fat, said buttered table syrup having a pH of about 4.0–5.5 and a viscosity no less than about 300 cps.

12. The emulsion system of claim 11 wherein the sugar solids content of said buttered table syrup is about 70% Brix.

13. The emulsion system of claim 11 wherein said sugar solids comprise a mixture of corn syrup, dextrose and sucrose.

14. The emulsion system of claim 11 wherein said buttered table syrup has a pH of about 4.5–5.0 and said viscosity is no greater than about 800 cps.

15. The emulsion system of claim 14 wherein said viscosity is about 400–600 cps.

16. The emulsion system of claim 11 that includes gum ghatti as viscosity agent in an amount of about 0.5–1.0% by weight.

17. An emulsion system for a homogeneous buttered table syrup having a sugar solids content of at least about 67% Brix, said emulsion system consisting essentially of at least 0.1% by weight to about 0.4% by weight sodium stearoyl-2-lactylate; at least 0.2% by weight to about 0.4% by weight sorbitan monostearate; and, at least 1.6% by weight anhydrous butter oil or anhydrous butter fat, said buttered table syrup comprising a mixture of corn syrup, dextrose and sucrose and having a pH of about 4.0–5.5 and a viscosity no less than about 300 cps and no greater than about 800 cps.

18. The emulsion system of claim 17 wherein the sugar solids content of said buttered table syrup is about 70% Brix.

19. The emulsion system of claim 17 wherein said buttered table syrup has a pH of about 4.5–5.0.

20. The emulsion system of claim 17 wherein said buttered table syrup has a viscosity of about 400–600 cps.

21. The emulsion system of claim 17 that includes gum ghatti as viscosity agent in an amount of about 0.5–1.0% by weight.

22. A stable, homogeneous buttered table syrup having a sugar solids content of at least 65% Brix obtained from a mixture of corn syrup, dextrose and sucrose; a pH of about 4.0–5.5; a viscosity no less than about 300 cps; and, an emulsion system consisting essentially of at least 0.1% by weight sodium stearoyl-2-lactylate, at least 0.2% by weight sorbitan monostearate, and at least 2.0% by weight butter.

23. A stable, homogeneous buttered table syrup having a sugar solids content of at least about 67% Brix obtained from a mixture of corn syrup, dextrose and sucrose; a pH of about 4.0–5.5; a viscosity no less than about 300 cps and no greater than about 800 cps; and, an emulsion system consisting essentially of at least 0.1% by weight to about 0.4% by weight sodium stearoyl-2-lactylate, at least 0.2% by weight to about 0.4% by weight sorbitan monostearate, and at least 2.0% by weight anhydrous butter or anhydrous butter oil fat.

24. The table syrup of claim 23 wherein said sugar solids content is about 70% Brix.

25. The table syrup of claim 23 wherein said pH is about 4.5–5.0.

26. The table syrup of claim 23 wherein said viscosity is about 400–600 cps.

27. The table syrup of claim 23 that includes gum ghatti as viscosity agent in an amount of about 0.5–1.0% by weight.

28. A method for obtaining a stable, homogeneous buttered table syrup comprising:

blending together a mixture of about 75% by weight of the added water and all sweeteners comprising a mixture of corn syrup, dextrose, and sucrose together with brown sugar syrup at a temperature of about 120° F. for a period of about 15–30 minutes;

separately preparing an emulsion system melt consisting essentially of a mixture of at least 0.1% by weight sodium stearoyl-2-lactylate, at least 0.2% by weight sorbitan monostearate and at least 2.0% by weight butter at a temperature of about 160° F.;

separately preparing a blend of flavor agents selected from the group consisting of brown sugar flavor, butter flavor, butter vanilla flavor, maple flavor and mixtures thereof and heating said flavor blend to a temperature of about 120° F.;

separately preparing, with the remaining 25% by weight added water, a mixture containing preservatives, buffering agents, metal chelating agents and pH adjustment agents;

adding said flavor agent blend to said sweetener mixture while maintaining the temperature of said mixture at about 120° F.;

agitating the resultant mixture-blend while increasing its temperature to about 130° F. to obtain a base syrup;

adding said emulsion system melt to said base syrup with rapid agitation while maintaining its temperature at about 130°–135° F. and continuing said agitated mixing until a uniform syrup blend is obtained;

adjusting the sugar solids content of said syrup blend to at least about 65% Brix; and, raising the temperature of said adjusted syrup blend to about 170° F. for a period of about 10 minutes and homogenizing said syrup blend to obtain a homogeneous, stable buttered table syrup.

29. A method for obtaining a stable, homogeneous buttered table syrup comprising:

blending together a mixture of about 75% by weight of the added water and all sweeteners comprising a mixture of corn syrup, dextrose, and sucrose together with brown sugar syrup at a temperature of about 120° F. for a period of about 15–30 minutes;

separately preparing an emulsion system melt consisting essentially of a mixture of at least 0.1% by weight to about 0.4% by weight sodium stearoyl-2-lactylate, at least 0.2% by weight to about 0.4% by weight sorbitan monostearate and at least 1.6% by weight anhydrous butter oil or anhydrous butter fat at a temperature of about 160° F.;

separately preparing a blend of flavor agents selected from the group consisting of brown sugar flavor, butter flavor, butter vanilla flavor, maple flavor and mixtures thereof and heating said flavor blend to a temperature of about 120° F.;

separately preparing, with the remaining 25% by weight added water, a mixture containing preservatives, buffering agents, metal chelating agents and pH adjustment agents;

adding said flavor agent blend to said sweetener mixture while maintaining the temperature of said mixture at about 120° F.;

agitating the resultant mixture-blend while increasing its temperature to about 130° F. to obtain a base syrup;

adding said emulsion system melt to said base syrup with rapid agitation while maintaining its temperature at about 130°–135° F. and continuing said agitated mixing until a uniform syrup blend is obtained;

adjusting the sugar solids content of said syrup blend to at least about 67% Brix;

adjusting the pH of said syrup blend to about 4.0–5.5;

adjusting the viscosity of said syrup blend to no less than about 300 cps; and, raising the temperature of said adjusted syrup blend to about 170° F. for a period of about 60 minutes and homogenizing said syrup blend to obtain a homogeneous, stable buttered table syrup.

30. The method of claim 29 wherein said sugar solids content is adjusted to about 70% Brix.

31. The method of claim 29 wherein said viscosity is adjusted to be no greater than about 800 cps.

32. The method of claim 31 wherein said viscosity is adjusted to be about 400–600 cps.

33. The method of claim 29 wherein said emulsion system blend includes gum ghatti as viscosity agent in an amount of about 0.5–1.0% by weight.

34. An emulsion system for a homogeneous, stable buttered table syrup having a sugar solids content of at least 65% Brix, said emulsion system consisting essentially of at least 0.1% by weight sodium stearoyl-2-lactylate; at least 0.2% by weight sorbitan monostearate; and, at least 2.0% by weight butter.

35. A stable, homogeneous buttered table syrup having a sugar solids content of at least 65% Brix obtained from a mixture of corn syrup, dextrose and sucrose; a pH of about 4.0–5.5; a viscosity no less than about 300 cps; and, an emulsion system consisting essentially of at least 0.1% by weight sodium stearoyl-2-lactylate, at least 0.2% by weight sorbitan monostearate, and at least 1.6% by weight anhydrous butter oil or anhydrous butter fat.

36. The table syrup of claim 35 wherein said sugar solids content is at least about 67% Brix.

37. The table syrup of claim 36 wherein said sugar solids content is about 70% Brix.

38. The table syrup of claim 35 wherein said pH is about 4.5–5.0 and said viscosity is no greater than about 800 cps.

39. The table syrup of claim 38 wherein said viscosity is about 400–600 cps.

40. The table syrup of claim 35 wherein said sodium stearoyl-2-lactylate and said sorbitan monostearate are present in amounts of up to about 0.4% by weight.

41. The table syrup of claim 35 wherein said anhydrous butter oil or anhydrous butter fat is present in an amount of at least about 2.0% by weight.

42. The table syrup of claim 35 that includes gum ghatti as viscosity agent in an amount of about 0.5–1.0% by weight.

43. A method for obtaining a stable, homogeneous buttered table syrup comprising:

blending together a mixture of about 75% by weight of the added water and all sweeteners comprising a mixture of corn syrup, dextrose, and sucrose together with brown sugar syrup at a temperature of about 120° F. for a period of about 15–30 minutes;

separately preparing an emulsion system melt consisting essentially of a mixture of at least 0.1% by weight sodium stearoyl-2-lactylate, at least 0.2% by weight sorbitan monostearate and at least 1.6% by weight anhydrous butter oil or anhydrous butter fat at a temperature of about 160° F;

separately preparing a blend of flavor agents selected from the group consisting of brown sugar flavor, butter flavor, butter vanilla flavor, maple flavor and mixtures thereof and heating said flavor blend to a temperature of about 120° F.;

separately preparing, with the remaining 25% by weight added water, a mixture containing preservatives, buffering agents, metal chelating agents and pH adjustment agents;

adding said flavor agent blend to said sweetener mixture while maintaining the temperature of said mixture at about 120° F.;

agitating the resultant mixture-blend while increasing its temperature to about 130° F. to obtain a base syrup;

adding said emulsion system melt to said base syrup with rapid agitation while maintaining its temperature at about 130°–135° F. and continuing said agitated mixing until a uniform syrup blend is obtained;

adjusting the sugar solids content of said syrup blend to at least about 65% Brix; and, raising the temperature of said adjusted syrup blend to about 170° F. for a period of about 10 minutes and homogenizing said syrup blend to obtain a homogeneous, stable buttered table syrup.

44. The method of claim 43 wherein said emulsion system melt contains said sodium stearoyl-2-lactylate and said sorbitan monostearate in amounts of up to about 0.4% by weight.

45. The method of claim 43 wherein said anhydrous butter oil or anhydrous butter fat is present in an amount of at least about 2.0% by weight.

46. The method of claim 43 wherein the sugar solids content of said syrup blend is adjusted to at least about 67% Brix.

47. The method of claim 46 wherein said sugar solids content is adjusted to about 70% Brix.

48. The method of claim 43 wherein the pH and viscosity of said table syrup are adjusted to about pH 4.0–5.5 and no less than about 300 cps viscosity.

49. The method of claim 48 wherein said viscosity is adjusted to be no greater than about 800 cps.

50. The method of claim 49 wherein said viscosity is adjusted to be about 400–600 cps.

51. The method of claim 43 wherein said emulsion system melt includes gum ghatti as viscosity agent in an amount of about 0.5–1.0% by weight.

* * * * *